(12) United States Patent
Tronc et al.

(10) Patent No.: US 11,539,425 B2
(45) Date of Patent: Dec. 27, 2022

(54) SATELLITE COMMUNICATION SYSTEM AND METHOD OF COMMUNICATING IN A SATELLITE COMMUNICATION SYSTEM

(71) Applicant: European Space Agency, Paris (FR)

(72) Inventors: Jerome Tronc, Wantage (GB); Nicolas Girault, Leiden (NL); Ana Bolea Alamanac, Voorhout (NL); Xavier Geneste, Abingdon (GB); Michael Hadjitheodosiou, The Hague (NL)

(73) Assignee: European Space Agency, Paris (FR)

( * ) Notice: Subject to any disclaimer, the term of this patent is extended or adjusted under 35 U.S.C. 154(b) by 27 days.

(21) Appl. No.: 16/962,197

(22) PCT Filed: Jan. 15, 2018

(86) PCT No.: PCT/EP2018/050885
§ 371 (c)(1),
(2) Date: Jul. 14, 2020

(87) PCT Pub. No.: WO2019/137625
PCT Pub. Date: Jul. 18, 2019

(65) Prior Publication Data
US 2021/0067238 A1 Mar. 4, 2021

(51) Int. Cl.
*H04B 7/185* (2006.01)
*H04B 7/19* (2006.01)

(52) U.S. Cl.
CPC ....... *H04B 7/1851* (2013.01); *H04B 7/18521* (2013.01); *H04B 7/19* (2013.01)

(58) Field of Classification Search
CPC ..... H04B 7/1851; H04B 7/19; H04B 7/18521
See application file for complete search history.

(56) References Cited

U.S. PATENT DOCUMENTS

| 6,126,116 A | 10/2000 | Cellier |
| 6,512,920 B1 * | 1/2003 | Yaoya ................ H04B 7/18541 455/428 |

(Continued)

FOREIGN PATENT DOCUMENTS

| EP | 0 883 252 A2 | 12/1998 |
| WO | 01/91310 A2 | 11/2001 |
| WO | 2007/021685 A2 | 2/2007 |

OTHER PUBLICATIONS

International Search Report for Application No. PCT/EP2018/050885 dated Sep. 28, 2018, 12 pgs.

(Continued)

*Primary Examiner* — Rasheed Gidado
(74) *Attorney, Agent, or Firm* — Seed Intellectual Property Law Group LLP

(57) ABSTRACT

A satellite communication system includes a first satellite in a geostationary orbit and a plurality of second satellites. Each of the second satellites is in a separate orbit with time-dependent projection on ground. The first satellite is adapted to communicate with one or more user terminals and to communicate with each of the plurality of second satellites via a respective inter-satellite communication link. Further, each of the second satellites is adapted to communicate with one or more feeder link stations. Also disclosed is a method of communicating in a satellite communication system.

29 Claims, 10 Drawing Sheets

(56) References Cited

U.S. PATENT DOCUMENTS

| | | | | |
|---|---|---|---|---|
| 6,678,520 | B1* | 1/2004 | Wang | H04B 7/18513 |
| | | | | 455/13.1 |
| 7,672,638 | B1* | 3/2010 | Brown | H04B 7/19 |
| | | | | 455/12.1 |
| 7,831,202 | B2* | 11/2010 | Karabinis | H04B 7/18532 |
| | | | | 343/705 |
| 7,869,759 | B2* | 1/2011 | Pateros | H04B 7/18515 |
| | | | | 455/12.1 |
| 8,135,338 | B1* | 3/2012 | Gelon | H04B 7/18582 |
| | | | | 455/13.1 |
| 2002/0077099 | A1* | 6/2002 | LaPrade | H04B 7/18578 |
| | | | | 455/430 |
| 2003/0073404 | A1* | 4/2003 | Sauvageot | H04B 7/1851 |
| | | | | 455/13.1 |
| 2006/0056330 | A1* | 3/2006 | Anderson | H04N 7/20 |
| | | | | 370/316 |
| 2006/0189275 | A1 | 8/2006 | Karabinis | |
| 2007/0037514 | A1 | 2/2007 | Karabinis | |
| 2008/0146145 | A1 | 6/2008 | Pateros et al. | |
| 2010/0279604 | A1* | 11/2010 | Wood | H04B 10/118 |
| | | | | 455/12.1 |
| 2012/0119034 | A1* | 5/2012 | Kemper | B64G 1/242 |
| | | | | 244/158.5 |
| 2012/0184208 | A1* | 7/2012 | Renouard | H04B 7/18521 |
| | | | | 455/12.1 |
| 2012/0302160 | A1* | 11/2012 | Silny | H04B 7/18521 |
| | | | | 455/12.1 |
| 2017/0215190 | A1 | 7/2017 | Chung | |
| 2018/0375570 | A1* | 12/2018 | Lofquist | H04W 16/28 |
| 2019/0074893 | A1* | 3/2019 | Kaen | H04B 7/195 |

OTHER PUBLICATIONS

Communication pursuant to Article 94(3) EPC for European Application No. 18 700 492.4-1205, dated Mar. 11, 2022, 4 pages.

* cited by examiner

SATELLITE COMMUNICATION SYSTEM AND METHOD OF COMMUNICATING IN A SATELLITE COMMUNICATION SYSTEM

BACKGROUND

Technical Field

This disclosure relates to satellite communication systems and methods of communicating in a satellite communication system. In particular, the disclosure relates to such satellite communications systems and methods that use a plurality of feeder link satellites.

Description of the Related Art

In a classical Very High Throughput Satellite (VHTS) communication multi-beam system, a satellite repeater is used to relay information between a user terminal (e.g., Radio Frequency (RF) user terminal) and a gateway (gateway station) on the ground. The satellite repeater forms one or several user-link beams for communicating with the terminals and one or several feeder-link beams for communicating with the gateways. Usually these VHTS systems use the Ka band or Ku band on the user link. On the user link, the combination of available spectrum and signal polarization is divided in portions called colors. Adjacent beams use different colors to limit the intra-system interference since enough spatial separation cannot be achieved between adjacent beams. All users located in the same beam share the same color (i.e., a combination of frequency portion and signal polarization) through a multiple access mechanism using a time, frequency, or code division manner. It is the frequency reuse enabled by the multi beams coverage that allows the increase of throughput necessary to comply with the aggregated user communication demands. The frequency reuse factor is defined by the number of beams in the system divided by the number of colors. On the feeder link, the gateways are geographically separated (e.g., by several hundreds of kilometers), allowing for spatial separation between the feeder-link beams received/emitted by the satellite. This spatial separation between the feeder-link beams allows re-using the available spectrum at the gateway side for several times. In other words, only a single color at the gateway side is necessary when the gateways are sufficiently separated. On the other hand, suitable satellite gateways locations are scarce resources, and maintaining a high number of gateways leads to high capital expenditure and operational costs.

In a VHTS system scenario, the aggregated capacity on the user link can be very high (e.g., close or above one terabit/s) due to a massive frequency re-use factor employed on the user link (i.e., a very high number of beams and low number of colors). In that context, the feeder link can become a bottleneck when the frequency reuse factor required in the feeder link to address the user capacity demand is so high that it leads to a very high number of spatially separated gateways beams. In some cases, achieving this spatial separation over the targeted feeder coverage may prove difficult or unfeasible, that is, the aggregated capacity of the feeder link may not be sufficient for relaying the incoming/outgoing information from/to the user link. In other cases, the high number of gateway sites may lead to very high CAPital EXpenditure (CAPEX) and OPerational EXpenditure (OPEX), which may affect the economic viability of the system.

In addition, current telecommunications spacecraft are tailored to each mission and are built to last for up to 15 years. This is associated with high risks, costs, and long cycles that make it difficult to adapt to rapid changes in technology and market demand, possibly resulting in an exponential decrease of the profitability of the satellite during its lifetime. For instance, end-user needs and associated services are evolving rapidly, requiring frequent introduction of new features on the user terminal side, whereas Geosynchronous Equatorial Orbit (GEO) gateway ground stations (e.g., with 6 to 8 meters gateway antennas at Ka band) remain static over the lifetime of satellite missions and satellite gateways are sometimes maintained even longer, for several generations of satellites.

Using reconfigurable spacecraft, as are now being developed to improve flexibility during their lifetime, further increases complexity, risk, costs, and development cycles. On the other hand, cheaper and lower life spacecraft do not result in cost savings proportional to their planned lifespan as development and launch costs remain high.

Thus, there is a need for satellite communication systems and methods of communicating in satellite communication systems that provide for a higher aggregated capacity on the feeder link, for example exceeding the threshold of one terabit/s. There is further need for such systems and methods that allow for better efficiency, flexibility, modularity, and upgradability. There is yet further need for such systems and methods that reduce capital expenditures and service costs.

BRIEF SUMMARY

In view of this need, the present disclosure proposes a satellite communication system and a method of communicating in a satellite communication system having the features of the respective independent claims.

An aspect of the disclosure relates to a satellite communication system. The satellite communication system may include a first satellite (e.g., user satellite, user link satellite) in a geostationary orbit (e.g., traveling in a geostationary orbit, or being placed/deployed in a geostationary orbit). The first satellite may be a VHTS. The first satellite may be in the GEO, for example. The satellite communication system may further include a plurality of second satellites (e.g., feeder satellites, feeder link satellites). Each of the second satellites may be (e.g., travel, or be placed/deployed) in a separate orbit with time-dependent projection (e.g., beam, footprint) on ground. That is, the orbits of the second satellites may be different from a geostationary orbit. The first satellite may be adapted to communicate with one or more user terminals. The first satellite may communicate with the user terminals via user link beams or service beams (e.g., spot beams). The first satellite may communicate with the user terminals using RF communication and/or optical communication. The user terminals may be fixed or mobile (including maritime or airborne) ground-based terminals. In general, the user terminals may be at an altitude of less than 100 km above ground. The first satellite may be further adapted to communicate with each of the plurality of second satellites via a respective inter-satellite communication link (inter-satellite link (ISL)). Further, each of the second satellites may be adapted to communicate with one or more feeder link stations (e.g., gateway stations). At least one (e.g., all) of the feeder link stations may be located in the area of coverage provided by the first satellite, the area of coverage provided by the first satellite including the one or more user terminals. That is, the feeder link stations may be located in the area of coverage provided by the first satellite.

The second satellites may communicate with the feeder link stations via (respective) feeder links. Each of the second satellites may create beams to each of the feeder link stations. Each feeder link station may comprise one or more feeder link antennas. The feeder links may correspond to connections between one of the second satellites and one feeder link antennas in each of the feeder link stations. In this sense, a feeder link station may be seen as indicating a site at which substantially co-located feeder link antennas are provided. The second satellites may not be configured to communicate with the one or more user terminals. The satellite communication system may further include one or more additional first satellites that are adapted to communicate with the one or more user terminals or one or more additional user terminals, and to communicate with at least one (e.g., each) of the plurality of second satellites via respective additional inter-satellite communication links.

By separating the user link from the feeder link and using a plurality of second satellites for the feeder link, the proposed satellite communication system can implement a very high capacity feeder link (e.g., beyond one terabit/s). At the same time, this can be achieved with a reduced number of feeder link stations (gateway stations, gateway locations) compared to conventional satellite communication systems. The ability to reduce the number of feeder link stations can be seen as an enabler for satellite communication systems that would not be technologically feasible when using conventional approaches. In addition, the ability to reduce the number of feeder link stations can aid reduction of feeder link complexity aboard spacecraft as well as reduction of capital expenditures, ground interconnectivity, and operational costs for the feeder link stations.

Placing the second satellites in the proposed geosynchronous orbits makes advantageous use of the tracking capabilities of state-of-the-art feeder link stations/antennas. Further, the proposed placement allows achieving suitable spatial separation among the second satellites so that a higher frequency re-use factor can be achieved in the communication of the second satellites with the feeder link stations. Moreover, the proposed placement allows for sufficient spatial separation between the second satellites and the first satellite so that the available frequency spectrum can be re-used also between user link communication and feeder link communication. For example, both user link communication and feeder link communication may use the Ka band, possibly accompanied by other frequency bands. In consequence, the satellite placement for the plurality of second satellites proposed by the present disclosure allows reusing the same frequency without generating harmful interferences towards the first satellite or any other neighboring legacy GEO satellites operating in the same frequency bands.

Separating the user link from the feeder link and placing the second satellites in the proposed geosynchronous orbits further allows to for a better positioning of the first satellite along the GEO arc without having to deal with feeder link constraints. This can contribute to a more efficient use of the scarce orbital/spectrum slots on the GEO arc.

Lastly, separating the user link from the feeder link allows for a standardization of the second satellites (feeder satellites) and enables progressive deployment. This further enables more efficient user/feeder satellites because the mission can be specifically tailored to requirements. That is, a redundancy/satellite lifetime and renewal/launch strategy/batch production approach can be tailored specifically to the user/feeder satellites requirements, respectively.

In some embodiments, each of the second satellites may be (e.g., travel, be placed/deployed) in a separate inclined and/or eccentric geosynchronous orbit. This allows for optimal orbit separation of the second satellites from one another and of the second satellites from the first satellite, which in turn allows for enhanced frequency re-use (i.e., for a higher frequency re-use factor) and for an optimization of the system size (e.g., in terms of antennas, signal power, etc.).

In some embodiments, each of the second satellites may travel along a respective satellite track. Each satellite track may be an elongated satellite track with its latitudinal excursion greater than its longitudinal excursion. The second satellites traveling along such satellite tracks make advantageous use of the tracking capability of state-of-the-art feeder link stations/antennas.

In some embodiments, the orbit of each of the plurality of second satellites may be within a predetermined range of longitudes from the first satellite's orbit. In that case and during a limited period of time, the satellite track may overlap (or not provide sufficient separation) with a geostationary orbital location occupied by another satellite (e.g., legacy satellite) in a geostationary orbit. In this case, the respective second satellite may cease emission/reception (in general, communication) in overlapping frequencies when traveling in this interfering zone. During this short period, the aggregated feeder link capacity of the plurality of second satellites may be temporarily reduced due to limitations of emission/reception of the affected second satellite(s). Alternatively, the affected feeder communications of the first satellite may be routed towards other second satellites having spare feeder link capacities.

In some embodiments, the inclination of each of the second satellites' orbits may be below 15 degrees to comply with the ITU-R Geostationary-Satellite Orbit (GSO) status and associated regulated spectrum access as described by ITU Radio Regulations geostationary-satellite orbit definition No. S1.189 and Recommendation ITU-R S.743-1 for the coordination between satellite networks using slightly inclined GSOs and between such networks and satellite networks using non-inclined GSO satellites.

Additionally or alternatively, the orbit of each of the plurality of second satellites may be within ±2.5 degrees longitude from the first satellite's orbit. This arrangement can ease the frequency coordination process with potential neighboring co-frequency geostationary satellites. Moreover, the aforementioned range allows for sufficient spatial separation of the second satellites from one another and from the first satellite, which in turn allows for enhanced frequency re-use among the second satellites and between the first satellite and the second satellites.

In some embodiments, the first satellite and at least one of the plurality of second satellites may be spatially separated by such amount (e.g., distance) that allows for full (or at least partial) frequency re-use in the communication of the first satellite and the at least one second satellite with a given feeder link station. For example, the first satellite may use a third frequency band for communicating with the one or more user terminals. Further, there may be at least one of the plurality of second satellites that uses, for communicating with a given feeder link station, a fourth frequency band that has at least partial overlap with the third frequency band. Therein, the given feeder link station may be located in the area of coverage of the first satellite, the area of coverage of the first satellite including the one or more user terminals. This also allows for full (or at least partial) frequency re-use between communication of the first satellite with a user terminal in the area of coverage of the first satellite and communication of the at least one second satellite with the given feeder link station. Through reusing a fully (or at least partially) overlapping spectrum between the first satellite and the second satellites, the total required number of feeder link stations can be reduced compared to conventional multibeam GEO satellite communication systems.

In some embodiments, at least two of the plurality of second satellites may be spatially separated from each other by such amount (e.g., distance) that allows for full (or at least partial) frequency re-use in the communication of the at least two second satellites with a given feeder link station. For example, there may be at least one pair among the plurality of second satellites for which one of the second satellites of the pair uses a first frequency band for communicating with a given feeder link station and the other one of the second satellites of the pair uses, for communicating with the given feeder link station, a second frequency band that has at least partial overlap with the first frequency band. Enhanced frequency re-use among the second satellites allows to reduce the number of feeder link stations at a desired aggregated feeder link capacity.

In some embodiments, at least two of the plurality of second satellites may be spatially separated from each other by such amount (e.g., distance) that allows for full (or at least partial) frequency re-use in the communication of the first satellite with these at least two second satellites. Thereby, the aggregated capacity of the inter-satellite communication link can be increased.

In some embodiments, the plurality of second satellites may communicate with the feeder link stations using RF communication in the Ka band. Additionally, the plurality of second satellites may communicate with the feeder link stations using RF communication in any or all of the C band, the Ku band, the Q/V band, or the W band. Additionally or alternatively, the plurality of second satellites may communicate with the feeder link stations using optical communication. The Ka band, C band, Ku band, Q/V band, W band and G band may be the respective frequency bands as defined by the IEEE Standard Letter Designations for Frequency Bands (IEEE Std 521-2002).

In some embodiments, the inter-satellite communication links may use optical communication and/or RF communication. RF communication may use the Ka band and/or any or all of the V band, the W band, and G band that are allocated to the inter-satellite communication link in compliance with ITU-R regulations.

In some embodiments, each of the second satellites may be adapted to communicate, in each of one or more feeder link beams of that second satellite, with a respective feeder link antenna (e.g., at a feeder link station). That is, each of the second satellites may emit/receive one or more feeder link beams, wherein each feeder link beam is associated with a respective feeder link antenna. Therein, at least two of the feeder link antennas may be substantially co-located (e.g., at the satellite operator teleport). Spatial separation of these two feeder link antennas may be less than 1 km, for example. Additionally or alternatively, at least one feeder link antenna may communicate with two different second satellites in respective feeder link beams.

In some embodiments, the satellite communication system may further include the feeder link stations.

Another aspect of the disclosure relates to a method of communicating in a satellite communication system. The method may include communicating with one or more user terminals by a first satellite in a geostationary orbit. The method may further include communicating with each of a plurality of second satellites via a respective inter-satellite communication link by the first satellite. Each of the second satellites may be in a separate orbit with time-dependent projection on ground. The method may yet further include communicating, by each of the second satellites with one or more feeder link stations.

In some embodiments, each of the second satellites may be in a separate inclined and/or eccentric geosynchronous orbit.

In some embodiments, each of the second satellites may travel along a respective satellite track. Each satellite track may be an elongated satellite track with its latitudinal excursion greater than its longitudinal excursion.

In some embodiments, the orbit of each of the plurality of second satellites may be within a predetermined range of longitudes from the first satellite's orbit.

In some embodiments, the inclination of each of the second satellites' orbits may be below 15 degrees. Additionally or alternatively, the orbit of each of the plurality of second satellites may be within ±2.5 degrees longitude from the first satellite's orbit.

In some embodiments, the first satellite and at least one of the plurality of second satellites may be spatially separated by such amount that allows for full (or at least partial) frequency re-use in the communication of the first satellite and the at least one second satellite with a given feeder link station. The method may include communicating, by the first satellite, employing full (or at least partial) frequency re-use with respect to the communication of the at least one second satellite with the given feeder link station.

In some embodiments, at least two of the plurality of second satellites may be spatially separated from each other by such amount that allows for full (or at least partial) frequency re-use in the communication of the at least two second satellites with a given feeder link station. That is, the method may include communicating, by the at least two second satellites with the given feeder link station, employing full (or at least partial) frequency re-use.

In some embodiments, at least two of the plurality of second satellites may be spatially separated from each other by such amount that allows for full (or at least partial) frequency re-use in the communication of the first satellite with these at least two second satellites. Accordingly, the method may include communicating, by the first satellite, with the at least two second satellites, employing full (or at least partial) frequency re-use.

In some embodiments, there may be at least one pair among the plurality of second satellites for which one of the second satellites of the pair uses a first frequency band for communicating with a given feeder link station and the other one of the second satellites of the pair uses, for communicating with the given feeder link station, a second frequency band that has at least partial overlap with the first frequency band.

In some embodiments, the first satellite may use a third frequency band for communicating with the one or more user terminals. Further, there may be at least one of the plurality of second satellites that uses, for communicating with a given feeder link station, a fourth frequency band that has at least partial overlap with the third frequency band. Therein, the given feeder link station may be located in the area of coverage of the first satellite. The area of coverage of the first satellite may include the one or more user terminals.

In some embodiments, the plurality of second satellites may communicate with the feeder link stations using RF communication in the Ka band, and optionally, any or all of the C band, the Ku band, the Q/V band, or the W band. Additionally or alternatively, the plurality of second satellites may communicate with the feeder link stations using optical communication.

In some embodiments, the inter-satellite communication links may use optical communication and/or RF communication.

In some embodiments, each of the second satellites may be adapted to communicate, in each of one or more feeder link beams of that second satellite, with a respective feeder link antenna. Therein, at least two of the feeder link antennas may be substantially co-located. Additionally or alternatively, at least one feeder link antenna may communicate with two different second satellites in respective feeder link beams.

In some embodiments, the method may further include adding (e.g., by launching/deploying) one or more additional second satellites to an operating satellite communication system comprising the first satellite and the plurality of second satellites.

In some embodiments, the method may further include relocating the first satellite during the lifetime of the first satellite to communicate with user terminals in a different area of coverage without relocating the plurality of second satellites. Additionally or alternatively, the method may further include replacing the first satellite without replacing the plurality of second satellites.

It will be appreciated that method steps and apparatus or system features may be interchanged in many ways. In particular, the details of the disclosed method can be implemented by an apparatus or system, and vice versa, as the skilled person will appreciate. Moreover, any of the above statements made with respect to methods are understood to likewise apply to apparatus and systems, and vice versa.

BRIEF DESCRIPTION OF THE SEVERAL VIEWS OF THE DRAWINGS

Example embodiments of the disclosure are explained below with reference to the accompanying drawings, wherein FIG. 1 schematically illustrates an example of a satellite communication system, FIG. 2 schematically illustrates an example of a satellite communication system according to embodiments of the disclosure, FIG. 3 schematically illustrates an orbit of a second satellite in a satellite communication system according to embodiments of the disclosure, FIGS. 4A, 4B, and 4C schematically illustrate satellite tracks of second satellites in satellite communication systems according to embodiments of the disclosure, FIG. 5 schematically illustrates the orbit/satellite track of second satellites of the satellite communication system according to embodiments of the disclosure in relation to other satellites in a geostationary orbit, FIG. 6 schematically illustrates another example for the orbit/satellite tracks of second satellites in a satellite communication system according to embodiments of the disclosure in relation to other satellites in a geostationary orbit, FIG. 7 schematically illustrates another example of a satellite communication system according to embodiments of the disclosure.

DETAILED DESCRIPTION

In the following, example embodiments of the disclosure will be described with reference to the appended figures. Identical elements in the figures may be indicated by identical reference numbers, and repeated description thereof may be omitted.

Figure 1:
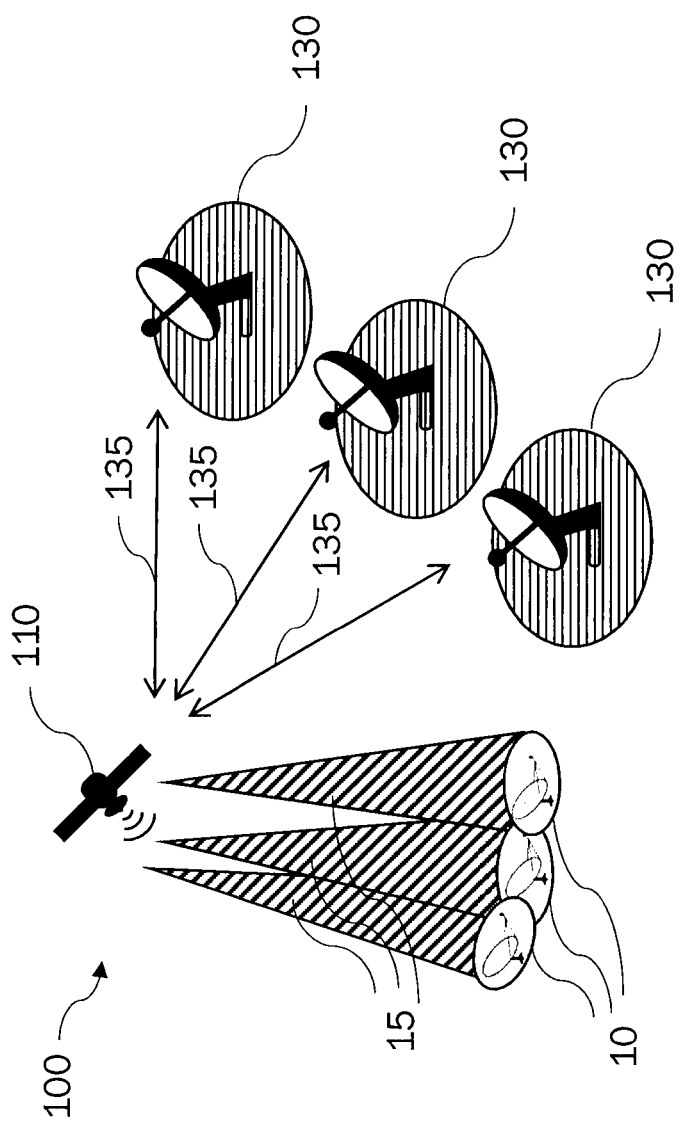

FIG. 1 schematically illustrates an example of a satellite communication system 100. The satellite communication system 100 comprises a satellite repeater 110 in a geostationary orbit (e.g., GEO orbit). The satellite repeater 110 communicates with a plurality of user terminals 10 in a plurality of user link beams or service beams 15 (e.g., spot beams on ground). The user terminals 10 may be ground-based terminals (including maritime terminals) or airborne terminals (e.g., aboard airplanes or balloons). Typically, the user terminals are located at an altitude (above ground) of less than 100 km. The satellite repeater 110 may use RF communication for communicating with the user terminals 10. Typically, the satellite repeater 110 uses RF communication in the Ka band. The satellite repeater 110 further communicates with a plurality of gateways (gateway stations) 130, in a plurality of respective feeder links (feeder link beams) 135. To enable full (or at least partial) frequency re-use in the communication with the gateways 130, it is required that the gateways are spatially separated from each other by a given minimum distance, typically several hundreds of kilometers.

Starting from the satellite communication system 100 of FIG. 1, several measures (or a combination of them) could be envisaged to obtain a satellite communication system that provides for a very high throughput feeder link (e.g., with an aggregated capacity in excess of 1 terabit/s). For example, as a first measure a large number of gateways (gateway sites) 130 within the user coverage could be used, on a portion of the Ka band spectrum that is not used on the user link. As a second measure, a large number of gateways outside the user coverage could be used. This would allow employing the complete Ka band spectrum for gateway transmission (i.e., for the feeder link). As a third measure, communication on the feeder link could be moved to higher frequency bands (e.g., Q/V or W-band), still using a significant number of gateway sites (at least partially for redundancy to accommodate for propagation impairments at high frequencies).

What any satellite communication systems employing the above measures have in common is that these systems require a complex and expensive ground system composed of a large number of gateways (gateway sites) that need to be interconnected on the ground. When the capacity demand on the user link increases beyond the terabit/s threshold, such satellite communication systems will be limited by the available spectrum in the feeder link and by the spatial separation required on the gateway side in order to allow for a full (or at least partial) frequency re-use. Having a large number of gateways sufficiently separated is extremely expensive for the ground segment and may require a large on-board antenna in the satellite, making such solutions economically and even technically difficult to implement. Thus, a user link capacity demand in excess of 1 terabit/s will pose a significant challenge for implementing a suitable feeder link in conventional satellite communication systems.

Satellite communication systems and methods of communicating in satellite communication systems according to embodiments of the disclosure enable an increase of the aggregated capacity on the feeder link, for example to several terabit/s, at a fraction of the costs that would be incurred in the aforementioned scenarios.

Broadly speaking, the present disclosure splits user link and feeder link (gateway) functionalities into separate "user" satellites (first satellites) and "feeder" satellites (second satellites) that are connected through inter-satellite links (ISLs). The present disclosure makes use of several feeder satellites connected to a limited number of gateways sites. Due to judicious orbit positioning of the feeder satellites (using inclination and/or eccentricity separation), it is possible to simultaneously operate several feeder satellites with sufficient angular separation to allow for full (or at least partial) frequency re-use of the feeder spectrum between the feeder satellites and also between the user satellite and the feeder satellites. Additionally, due to judicious orbit positioning of the feeder satellites (using inclination and/or eccentricity separation), it is possible to simultaneously operate several (RF or optical) ISL terminals to/from the user satellite with sufficient angular separation as viewed from the user satellite in order to allow for full (or at least partial) frequency re-use of the inter-satellite spectrum allocation between the various feeder satellites.

The combination of feeder satellites and gateway diversity as proposed by the present disclosure allows for a very high frequency re-use factor on the feeder link. Thus, the present disclosure allows reducing the number of gateway sites, together with the associated infrastructure, operation costs, and network costs. Moreover, the present disclosure provides for the ability to "pay as you grow" by adding more feeder satellites that can be gradually deployed, to cope with potentially increasing demand on the user link. The present disclosure also contributes to a more efficient use of the scarce spectrum resources and scarce GEO orbital slot resources for user communication purposes.

Figure 2:
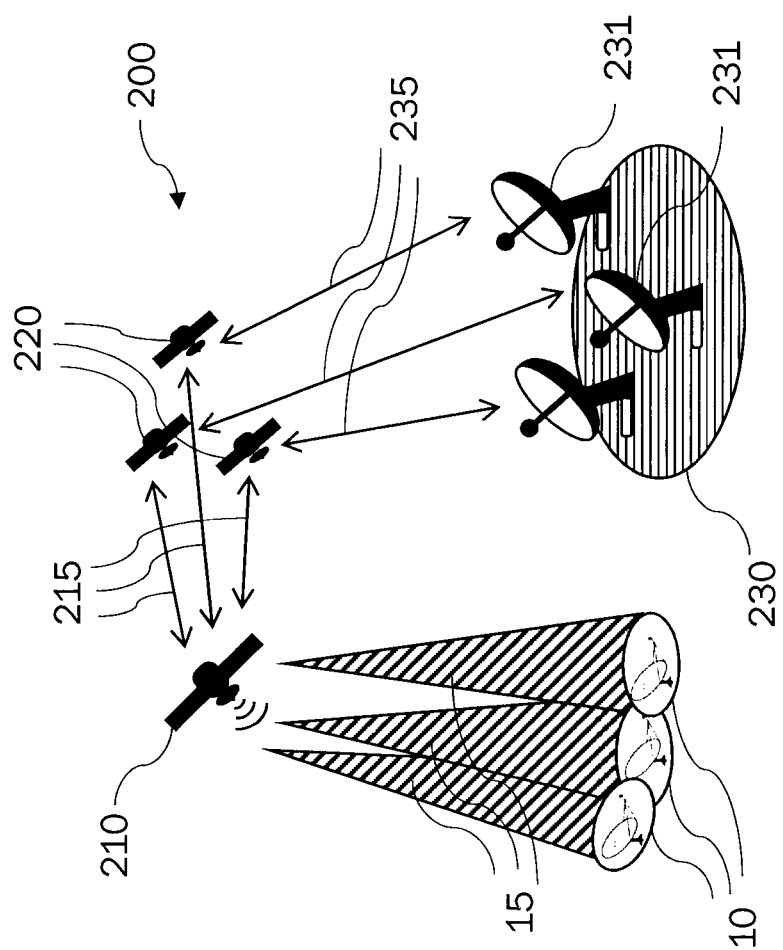

FIG. 2 schematically illustrates an example of a satellite communication system 200 according to embodiments of the disclosure. The present disclosure defines two different types of satellites: feeder satellites designed to manage the feeder link beams, and user satellite(s) designed to manage the user link beams. Accordingly, in the satellite communication system 200, the repeater satellite is "split" into a first satellite 210 and a plurality of second satellites 220. The first satellite 210 may be referred to as a user satellite or user link satellite. The first satellite 210 may be a VHTS, for example. The second satellites 220 may be referred to as feeder satellites or feeder link satellites. The second satellites 220 may be low cost standardized satellites, for example, allowing for a high replacement rate.

The first satellite 210 communicates with one or more (e.g., with a plurality) of user terminals 10, for example in a plurality of user link beams 15. On the other hand, the second satellites 220 may not be able to communicate with the user terminals 10.

The area in which user terminals are located that communicate with the first satellite 210 defines the area of coverage (user coverage) of the first satellite 210. For example, the area of coverage of the first satellite 210 may be defined by the spot beams on ground of the first satellite 210.

The user terminals 10 in the satellite communication system 200 may be identical to the user terminals 10 in the satellite communication system 100. The first satellite 210 may communicate with the user terminals 10 in the same manner as described above with reference to the satellite communication system 100, for example. That is, the first satellite 210 may communicate with the user terminals using RF communication, for example in the Ka band. Additionally or alternatively, the first satellite 210 may communicate with the user terminals 10 using optical communication. This can be particularly advantageous if the user terminals 10 are airborne terminals.

The first satellite 210 further communicates with the plurality of second satellites 220 via respective inter-satellite links (ISLs) 215. The ISLs 215 may also be referred to as inter-satellite communication links. The ISLs 215 may use optical communication and/or RF communication. Therein, RF communication may use the Ka band, and/or any or all of the V band, the W band, and G band that are allocated to the ISL 215 in compliance with ITU-R regulations. In some embodiments, the ISLs 215 may be short range ISLs combining performance (e.g., several GHz of spectrum per ISL) and low cost. In this context, "short range" may refer to a distance of thousands of kilometers, as opposed to tens of thousands of kilometers between the GEO and Earth.

Each of the plurality of second satellites 220 communicates with one or more feeder link stations 230 (e.g., gateway stations). The feeder link stations 230 may be further referred to as feeder link sites (or locations). FIG. 2 shows a single feeder link station 230, but the present disclosure generally relates to the case of one or more (e.g., plural) feeder link stations 230. The feeder link stations 230 may be ground-based, for example. The second satellites 220 may communicate with the feeder link stations 230 via respective feeder links 235. That is, there is one feeder link 235 for each pair of a second satellite 220 and a feeder link station 230. The feeder links 235 may correspond to, or may be implemented by, respective feeder link beams. Different second satellites 220 do not necessarily need to communicate with the same set of feeder link stations 230. Nevertheless, from an efficiency point of view, it may be preferable that for a given set of feeder link stations 230, each second satellite 220 communicates with each feeder link station 230 of the given set. Notably, each feeder link station 230 may comprise one or more feeder link antennas 231. The feeder link antennas 231 of a given feeder link station 230 may be substantially co-located (e.g., separated by less than 1 km).

The second satellites 220 communicate with the feeder link stations 230 using optical communication and/or RF communication. In the case of RF communication, the second satellites 220 may communicate with the feeder link stations 230 in the Ka band and optionally in any or all of the C band, the Ku band, the Q/V band, or the W band. Here, the Ka band, C band, Ku band, Q/V band, and W band may be the respective frequency bands as defined by the IEEE Standard Letter Designations.

In consequence, the first satellite 210 and the plurality of second satellites 220 can relay information between the one or more user terminals 10 and the feeder link stations 230. The first satellite 210 and the second satellites 220 thus can be said to jointly implement the functionality of the satellite repeater 110 in the satellite communication system 100 of FIG. 1.

The first satellite 210 is (e.g., is placed, is deployed, travels) in a geostationary orbit (e.g., the GEO). Each of the second satellites 220 is (e.g., is placed, is deployed, travels) in a separate geosynchronous orbit with time-dependent projection (e.g., footprint) on ground. In consequence, also the first satellite 210 and the second satellites 220 are placed in separate orbits. Decoupling user and feeder link orbit slot allocation will ease the coordination process of the satellites at the International Telecommunication Union (ITU) level, thus potentially allowing new operators to access the market. Further, this decoupling can ease interference management, as will be described below.

Usually, communication satellites are deployed either in Non-Geostationary Orbit (NGSO) (Low Earth Orbit (LEO), Medium Earth Orbit (MEO) or Highly Elliptical Orbit (HEO)) or in a Geostationary Earth Orbit (GEO) also referred to as Geosynchronous Equatorial Orbit. The GEO can be thought of as a circle around the Earth where the frequency spectrum can be shared typically every 3 to 2 degrees. This line can be extended to a certain zone around it to take into account the station keeping accuracy (typically a window of around 0.1° around the nominal position).

Embodiments of the disclosure use a different approach for satellite placement. Namely, according to embodiments of the disclosure, the second satellites 220 are each placed in respective (separate) geosynchronous orbits with time-dependent projection on ground. In general, the second satellites 220 may each be placed in a separate inclined and/or eccentric Geosynchronous Orbit (GSO). For example, a slightly inclined GSO may be used for the second satellites 220 (e.g., with an inclination of less than 15 degrees to cope with the ITU GSO status regulation definition). For example, each of the second satellites 220 may be placed in an inclined GSO with the other orbit parameters (such as the true anomaly, the argument of perigee, the longitude of the ascending node) specific to that second satellite 220. Analogous considerations may hold for the orbits' eccentricity. Thereby, all the spectrum/orbital slot resource in the GEO arc is left available to the user link.

Figure 3:
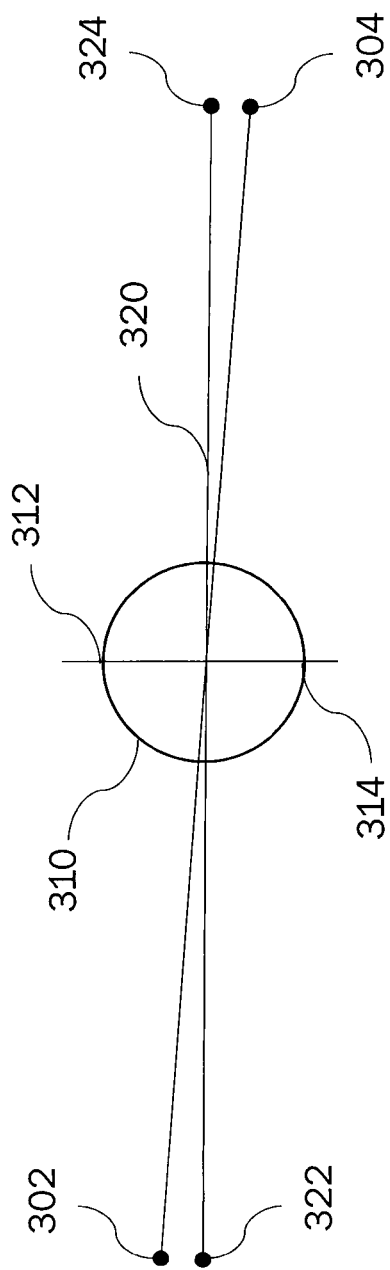

FIG. 3 illustrates an example of an inclined GSO 300 (with no eccentricity) that may be used for a second satellite 220 according to embodiments of the disclosure. The inclined GSO 300 around Earth 310 is inclined by a certain amount (e.g., angle) with respect to the GEO (equatorial plane) 320. References 312 and 314 indicate Earth's North pole and South pole, respectively. References 302 and 304 indicate extremal positions of a satellite in the inclined GSO 300. References 322 and 324 indicate extremal positions of a satellite in the GEO 320.

Figure 4A:
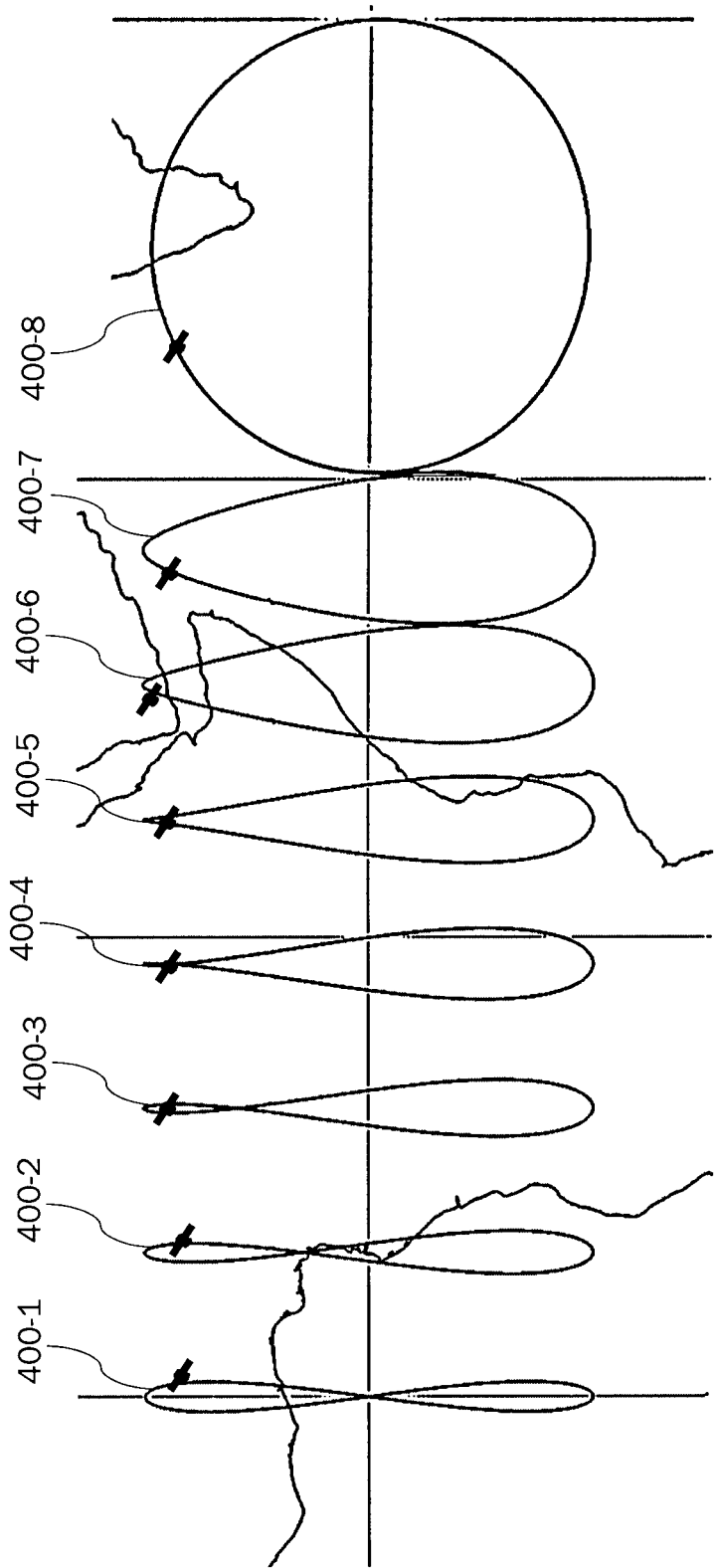
Figure 4B:
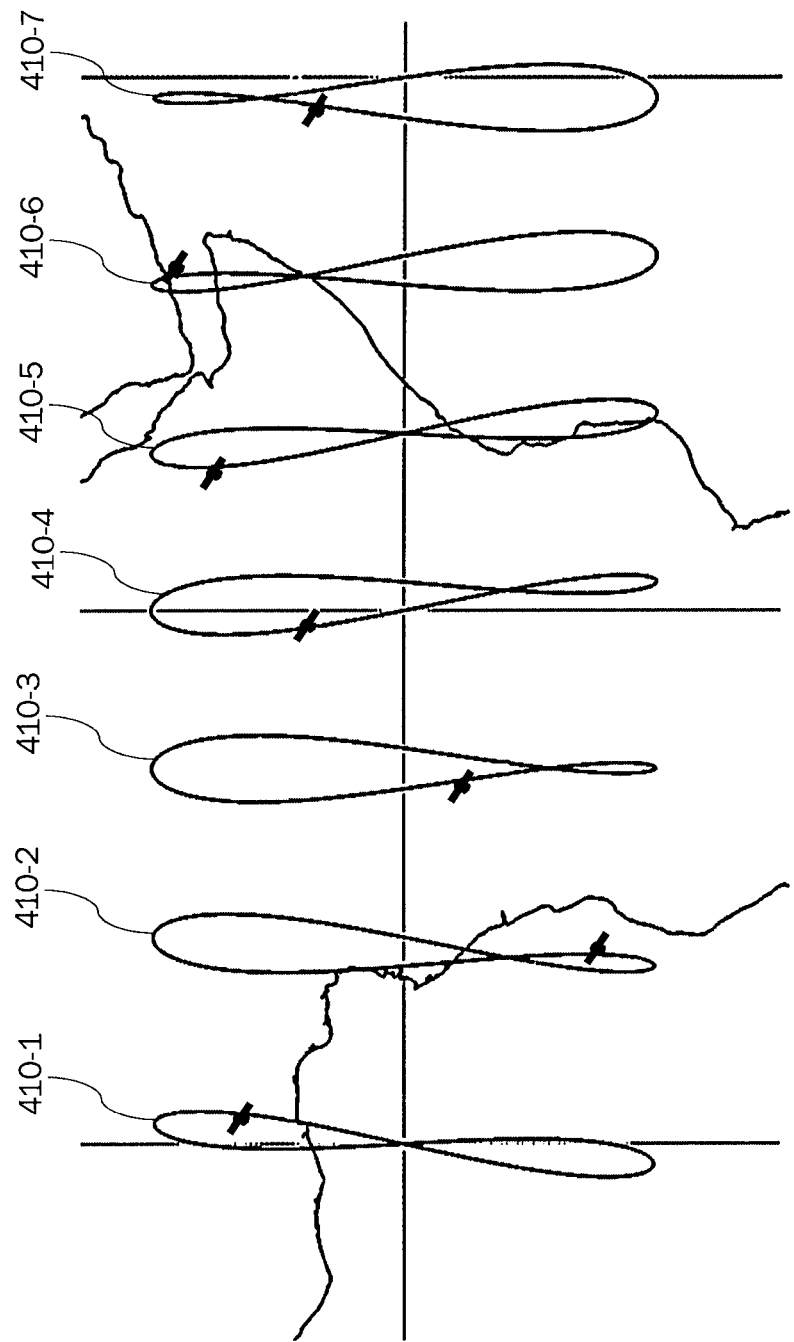
Figure 4C:
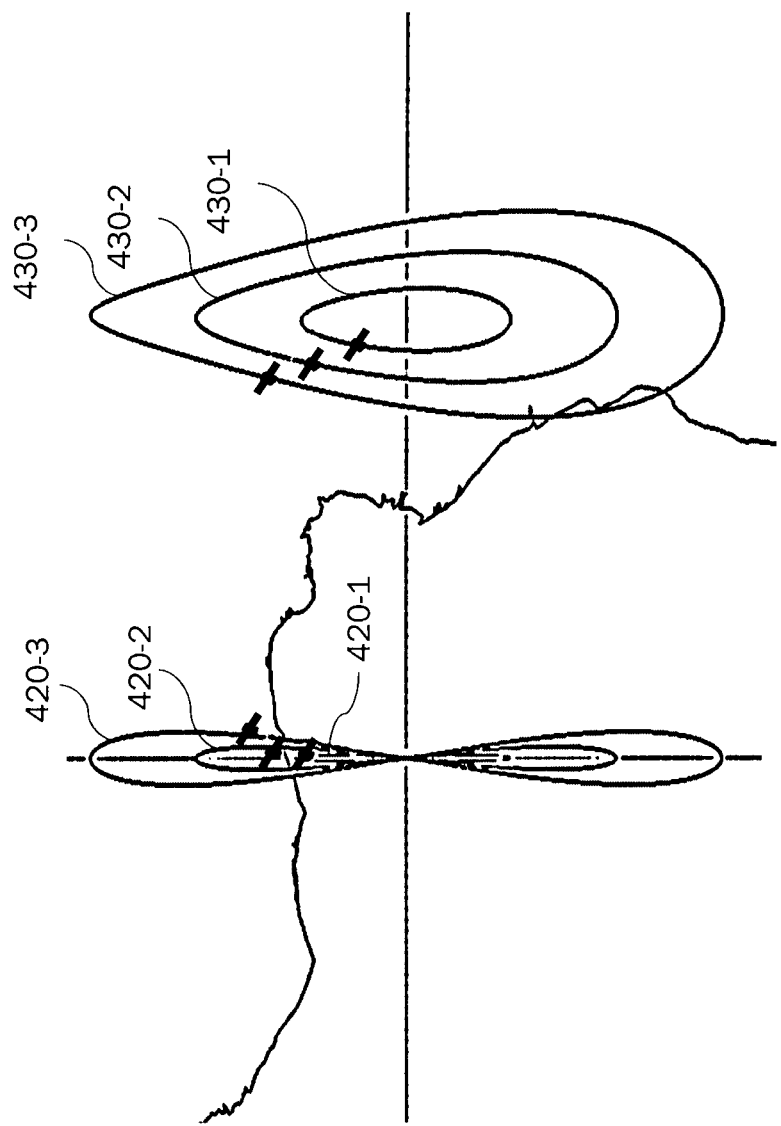

When observed from ground, each of the second satellites 220 travels along a respective satellite track. Examples of such satellite tracks are schematically illustrated in FIG. 4A, FIG. 4B, and FIG. 4C. In general, each satellite track may be an elongated satellite track with its latitudinal excursion greater than its longitudinal excursion. In particular, a satellite in an inclined GSO without eccentricity will travel in a satellite track that has a figure-eight-shape. In a more general approach, geosynchronous satellites travel with repeating ground tracks whose shape are a function of inclination, eccentricity and argument of perigee as illustrated in the examples of FIG. 4A, FIG. 4B, and FIG. 4C. Satellites operating in inclined GSOs have the same period of rotation as does the Earth (also referred to as one sidereal day of duration of approximately 23 hours 56 minutes) which is identical to that used for geostationary (GEO) satellites.

In the example of FIG. 4A, from left to right, the ground tracks 400-1 to 400-8 are associated with orbital eccentricities of 0.000, 0.005, 0.010, 0.015, 0.020, 0.030, 0.040, and 0.131, respectively, with 15 degrees inclination and 270° argument of perigee.

In the example of FIG. 4B, from left to right, the ground tracks 410-1 to 410-7 are associated with arguments of perigee of 0, 45, 90, 135, 180, 225, and 270 degrees, respectively, with 15 degrees inclination and 0.010 eccentricity.

FIG. 4C illustrates examples of different inclination configurations. On the left side, the figure illustrates inclined GSO ground tracks with no eccentricity. From inside to outside, the ground tracks 430-1 to 430-3 are associated with orbital inclination of 5, 10, and 15 degrees, respectively, with no eccentricity, argument of perigee equal to 270 degrees, true anomaly of 245 degrees and longitude of the ascending node of 0 degrees. On the right side, the figure illustrates the case of inclined and eccentric GSO ground tracks 430-1 to 430-3. The orbit parameters associated with these ground tracks are inclination 5 degrees, eccentricity 0.010, argument of perigee 270 degrees, longitude of the ascending node at 17.5 degrees, and true anomaly 245 degrees for ground track 430-1, inclination 10 degrees, eccentricity 0.020, argument of perigee 270 degrees, longitude of the ascending node at 18.75 degrees, and true anomaly 245 degrees for ground track 430-2, and inclination 15 degrees, eccentricity 0.030, argument of perigee 270 degrees, longitude of the ascending node at 20 degrees, and true anomaly 245 degrees for ground track 430-3.

In addition or as an alternative to the above, the orbit of each of the plurality of second satellites 220 may be within a predetermined range of longitudes from the first satellite's 210 orbit. For example, the orbit of each of the plurality of second satellites 220 may be within ±2.5 degrees longitude from the first satellite's 210 orbit. That is, each of the second satellites 220 may be placed in a GSO with a given longitudinal separation from the first satellite's 210 orbit specific to that second satellite. In general, each second satellite 220 may be placed in a GSO with a specific, distinct pair of an angle of inclination and a longitudinal separation from the first satellite's 210 orbit. Analogous considerations may hold for pair or triplets of orbit parameters involving the orbits' eccentricity. Thereby, all the spectrum/orbital slot resource in the GEO is left available to the user link. Moreover, the frequency coordination process with potential neighboring co-frequency geostationary satellites can be eased.

In the above case (i.e., for non-zero longitudinal separation from the first satellite's orbit), the satellite track of one or more second satellites 220 may overlap (or not provide sufficient separation) during a limited period of time with a geostationary orbital location occupied by a legacy satellite traveling in a geostationary orbit. In this case, the respective second satellite 220 may cease emission/reception (in general, communication) in overlapping frequencies when traveling in this interfering zone. During this short period, the aggregated feeder link capacity of the plurality of second satellites may be temporary reduced due to limitations of emission/reception of the affected second satellite(s) 220. To deal with this issue, the affected feeder communications of the first satellite 210 may be (temporarily) routed towards other second satellites 220 that have spare feeder link capacities.

Figure 5:
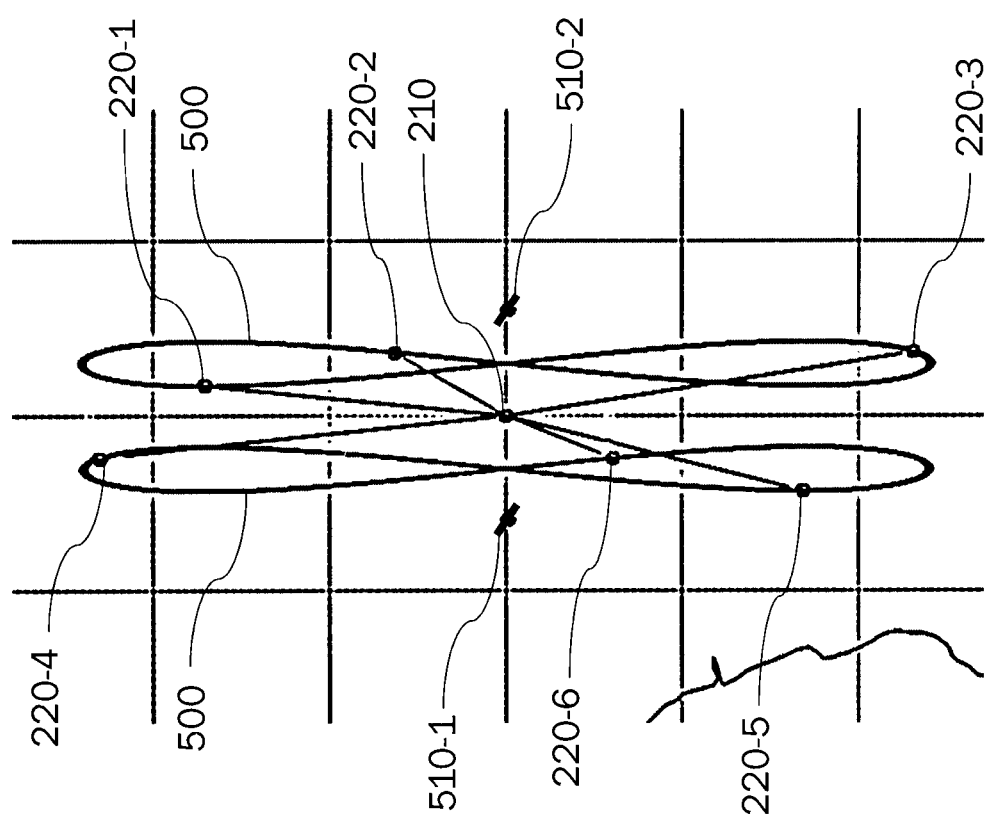

FIG. 5 schematically illustrates the orbits/satellite tracks 500 of several second satellites 220 of a satellite communication system according to embodiments of the disclosure in relation to other satellites 510 on the GEO arc (e.g., potential neighboring co-frequency geostationary satellites). As can be seen, the placement of the second satellites 220-1 to 220-6 in the specific orbits defined in the present disclosure allows for sufficient angular separation from the other satellites 510-1 and 510-2 and thereby eases the frequency coordination process with these other satellites 510. The orbit parameters in the example of FIG. 5 are the following: the first satellite 210, neighboring satellite 510-1, and neighboring satellite 510-2 are GEO satellites placed at longitude 20, 17 and 23 degrees, respectively. Neighboring satellites 510-1 and 510-2 represent potential neighboring co-frequency geostationary satellites of the first satellite 210. The plurality of second satellites 220 is placed in geosynchronous orbit with inclination 12 degrees and no eccentricity. Second satellite 220-1, second satellite 220-2, and second satellite 220-3 have the same longitude of the ascending node of 21.5 degrees with true anomaly of 45, 165 and 285 degrees respectively. Second satellite 220-4, second satellite 220-5, and second satellite 220-6 have the same longitude of the ascending node of 18.5 degrees with true anomaly of 105, 225 and 345 degrees, respectively. Notably, the orbital parameters listed above are understood to be non-limiting examples for the orbital parameters of the second satellites 220.

Figure 6:
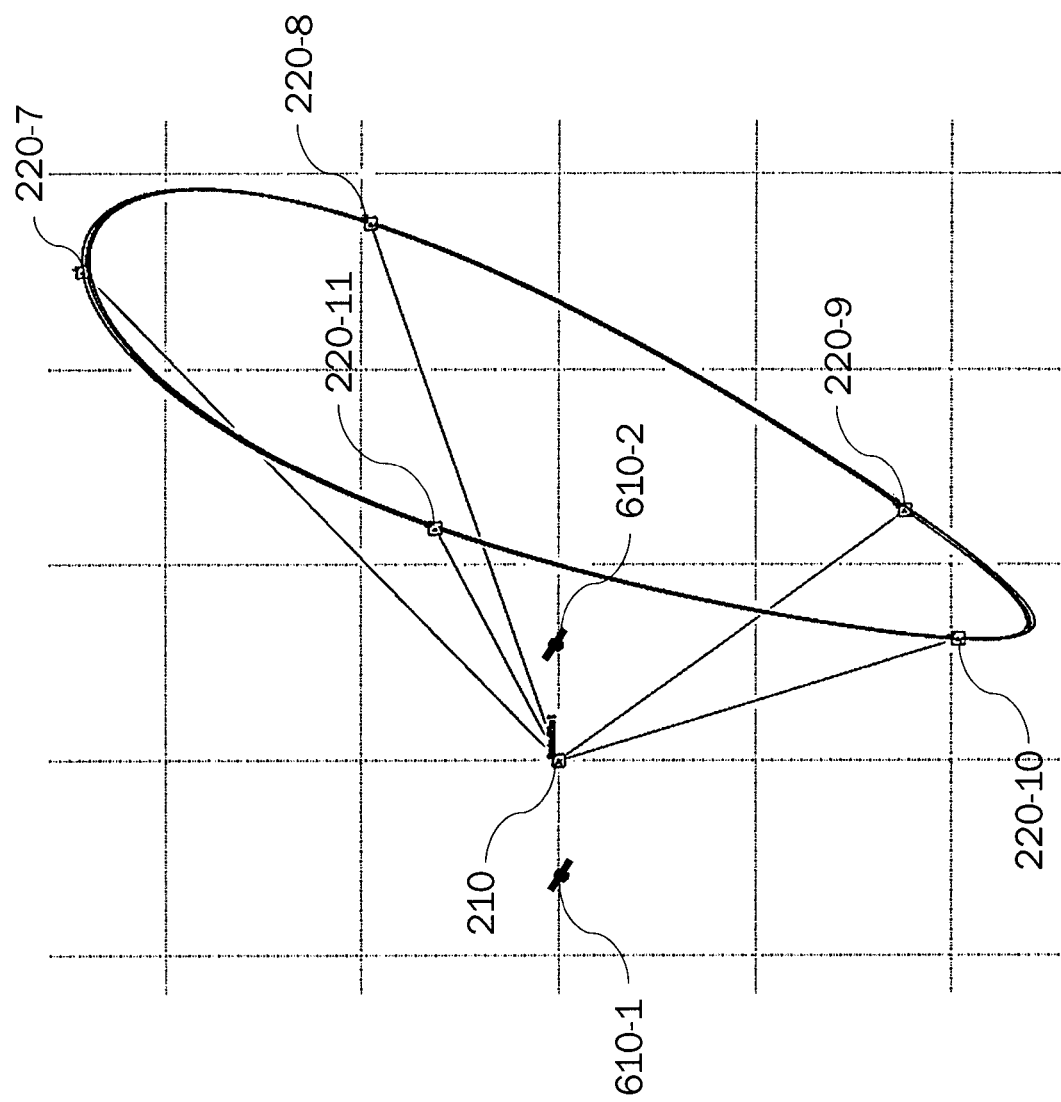

FIG. 6 illustrates another example of orbit/satellite tracks 600 with a different set of orbital parameters. The first satellite 210, neighboring satellite 610-1, and neighboring satellite 610-2 are GEO satellites placed at longitude 20, 23 and 17 degrees, respectively. Neighboring satellites 610-1 and 610-2 represent potential neighboring co-frequency geostationary satellites of the first satellite 210. The plurality of second satellites 220 is placed in geosynchronous orbit with inclination 12 degrees, eccentricity 0.05, argument of perigee 36 degrees, ascending node longitude of 25 degrees. Second satellite 220-7, second satellite 220-8, second satellite 220-9, second satellite 220-10, and second satellite 220-11 have a true anomaly of 36, 108, 180, 252 and 324 degrees, respectively. Notably, the orbital parameters listed above are understood to be non-limiting examples for the orbital parameters of the second satellites 220.

It should further be noted that the description and drawings in FIG. 5 and FIG. 6 merely illustrate the principles of the proposed system. Those skilled in the art will be able to implement various arrangements of the orbit parameters (e.g., considering the ones described in FIG. 4A, FIG. 4B, and FIG. 4C) with a variable number of second satellites to satisfy the specific system requirements as well as to ensure compliance with satellite coordination/regulatory constraints and optimize the various separation angles between satellites.

In general, since the second satellites 220 are provided in separate GSOs with time-dependent projection on ground, several second satellites 220 with sufficient separation (e.g., at different angles of inclination and/or at different longitudinal separation from the first satellite 210) can serve the first satellite 210. For example, the +/−15° inclination range (box) around the geostationary orbit (i.e., the equatorial plane) can accommodate several second satellites 220 at sufficient separation. As will be described in the following, the separation of the second satellites 220 allows for full (or at least partial) frequency re-use in the communication with the feeder link stations (e.g., gateways). Thereby, satellite communication systems and methods according to the present disclosure allow for a significant reduction of the number of feeder link stations (at a given desired aggregated feeder link capacity), thus allowing to reduce the operational cost of running the feeder link services.

In other words, placing the second satellites 220 in the orbits described above enables to separate the second satellites 220 by such amount (e.g., distance) from each other that allows for full (or at least partial) frequency re-use in the communication of the second satellites 220 with the feeder link stations 230. Specifically, by the aforementioned placement of the second satellites 220, at least two of the plurality of second satellites 220 can be spatially separated from each other by such amount (e.g., distance) that allows for full (or at least partial) frequency re-use in the communication of the at least two second satellites 220 with a given feeder link station 230. In general, satellite communication systems according to embodiments of the disclosure may be said to comprise second satellites 220 that are sufficiently separated from each other in the above sense to allow for such frequency re-use.

The frequency re-use between second satellites 220 can also be formulated in the following manner. That is, the satellite communication system according to embodiments of the disclosure comprises at least one pair among the plurality of second satellites for which one of the second satellites of the pair uses a first frequency band for communicating with a given feeder link station and the other one of the second satellites of the pair uses, for communicating with the given feeder link station, a second frequency band that has full (or at least partial) overlap with the first frequency band.

The above frequency re-use in the communication with the feeder link stations allows for a reduction of the number of feeder link stations at a desired aggregated feeder link capacity, as noted above. Consider for example the case of a conventional satellite repeater that communicates with two feeder link stations. In order to allow for frequency re-use in the feeder link communication, a spatial separation of the feeder link stations of several hundreds of kilometers is required. For the proposed satellite communication system however, a single feeder link station possibly with two feeder link antennas (or a phased array antenna) would be sufficient, since the two aforementioned (sufficiently separated) second satellites 220 can re-use the frequency spectrum when communicating with this single feeder link station. Needless to say, this example generalizes to larger numbers of sufficiently separated (e.g., pair-wise sufficiently separated) second satellites 220.

Placing the second satellites in the orbits described above also enables to separate the second satellites 220 and the first satellite 210 by such amount (e.g., distance) that allows for full (or at least partial) frequency re-use between the communication of the second satellites 220 with the feeder link stations 230 and the communication of the first satellite 210 with the user terminals 10. Specifically, by the aforementioned placement of the second satellites 220, the first satellite 210 and at least one of the plurality of second satellites 220 can be spatially separated from each other by such amount (e.g., distance) that allows for full (or at least partial) frequency re-use in the communication of the first satellite 210 and the at least one second satellite 220 with a given feeder link station 230. In general, satellite communication systems according to embodiments of the disclosure may be said to comprise a first satellite 210 and second satellites 220 that are sufficiently separated in the above sense to allow for such frequency re-use.

Notably, the above ability for frequency re-use enables the first satellite 210 to re-use the spectrum that is used by the at least one second satellite 220 for communicating with the given feeder link station 230 for communicating with a user terminal 10 in the area of coverage of the first satellite.

Thus, frequency re-use between the first satellite 210 and the second satellites 220 can also be formulated in the following manner. That is, in the satellite communication system according to embodiments of the disclosure, a given feeder link station 230 may be located in the area of coverage of the first satellite 210. Therein, the area of coverage (user coverage) of the first satellite is understood to include the one or more user terminals 10. For example, the area of coverage of the first satellite may be defined by the spot beams 15 of the first satellite 210 on ground. Then, the first satellite 210 uses a third frequency band for communicating with the one or more user terminals 15. Further, there is at least one of the plurality of second satellites 220 that uses, for communicating with the given feeder link station 230, a fourth frequency band that has full (or at least partial) overlap with the third frequency band. In general, satellite communication systems according to embodiments of the disclosure may be said to comprise second satellites 220 that are sufficiently separated from the first satellite 210 in the above sense to allow for such frequency re-use.

Placing the second satellites 220 in the orbits described above also enables to spatially separate the second satellites 220 from each other by such amount (e.g., distance) that allows for full (or at least partial) frequency re-use in the communication of the first satellite 210 with the second satellites 220 in the ISLs 215. Specifically, by the aforementioned placement of the second satellites 220, at least two of the plurality of second satellites can be spatially separated from each other by such amount (e.g., distance) that allows for full (or at least partial) frequency re-use in the communication of the first satellite 210 with these at least two second satellites 220 in the ISLs 215. In general, satellite communication systems according to embodiments of the disclosure may be said to comprise second satellites 220 that are sufficiently separated from each other in the above sense to allow for such frequency re-use.

Figure 7:
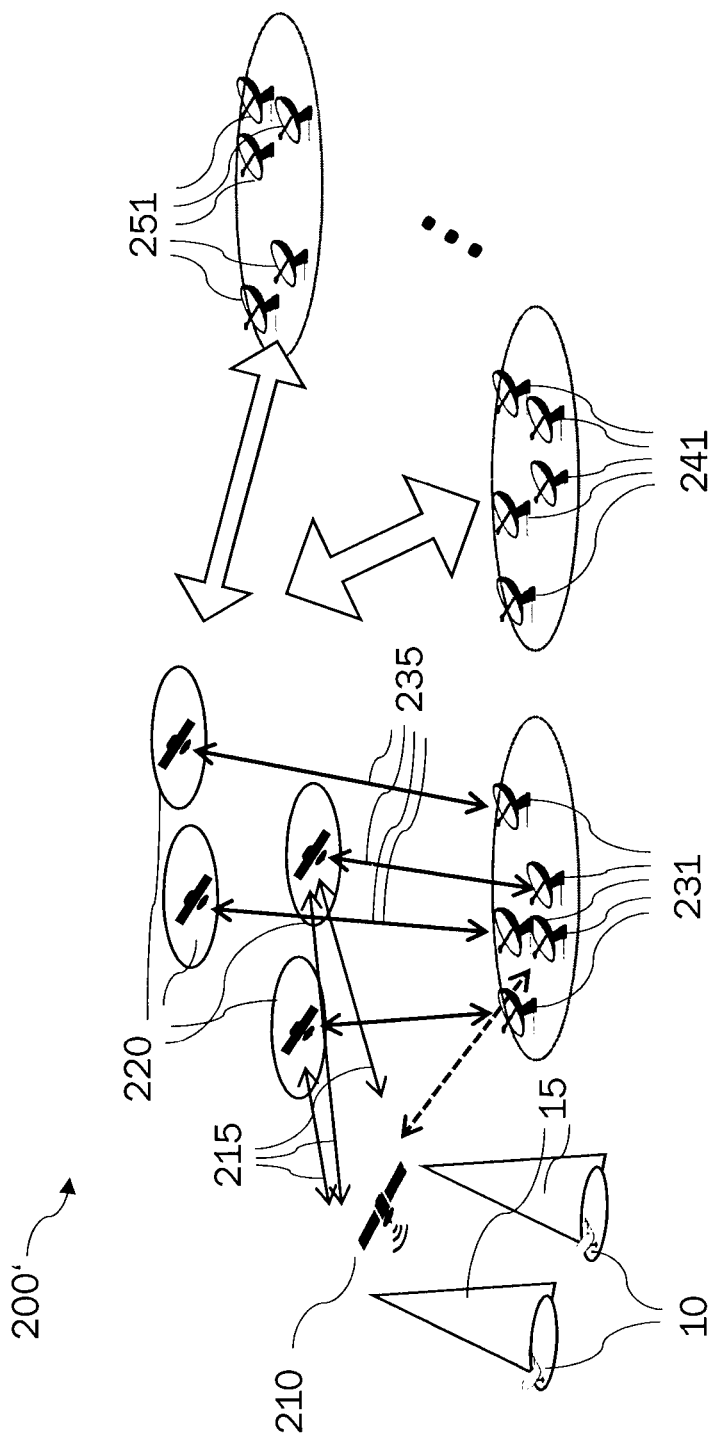

FIG. 7 schematically illustrates another example of a satellite communication system 200' according to embodiments of the disclosure. The satellite communication system 200' comprises a first satellite 210 and multiple second satellites 220. Configuration of these satellites may be the same as in the satellite communication system 200. The first satellite 210 may communicate with the user terminals 10 and with the second satellites 220 in the same manner as in the satellite communication system 200. Further, the second satellites 220 may communicate with the feeder link stations in the same manner as in the satellite communication system 200. Compared to FIG. 2, FIG. 7 explicitly illustrates plural feeder link stations 230, 240, 250 that are spatially separated from each other (e.g., by several hundreds of kilometers). Each feeder link station 230, 240, 250 comprises a plurality of feeder link antennas 231, 241, 251. For each feeder link station, its feeder link antennas may be substantially co-located (e.g., separated from each other by less than 1 km). Each second satellite 220 may communicate with each feeder link station. However, different second satellites 220 do not necessarily need to communicate with the same feeder link antenna within a given feeder link station. Compared to a conventional satellite communication system, the number of feeder link antennas may possibly be the same. What is important to note however is that the number of feeder link stations (i.e., the number of sites or locations at which the feeder link antennas are provided) can be significantly smaller than in conventional satellite communication systems, thereby saving associated costs. In particular, the proposed system allows to achieve a significantly higher frequency re-use factor by introducing a "multiplication factor" depending on the number of feeder satellites and feeder link stations (gateways). For instance, for 10 feeder satellites and 5 gateways, a frequency re-use factor of 10×5=50 can be achieved.

The satellite communication system 200 or the satellite communication system 200' may be said to comprise the first satellite 210 and the plurality of second satellites 220. Depending on the definition of the satellite communication system and circumstances, the satellite communication system 200 and/or the satellite communication system 200' may be further said to comprise the feeder link stations 230.

Moreover, the satellite communication system 200 in the example of FIG. 2 and the satellite communication system 200' in the example of FIG. 7 include a single first satellite 210 (user satellite) and plural second satellites 220 (feeder satellites). However, the present disclosure shall not be construed to be limited to satellite communication systems with a single first satellite 210, and the present disclosure is to be understood to extend also to satellite communication systems comprising multiple first satellites 210. For example, in a generalization of the satellite communication system 200 or the satellite communication system 200', the second satellites 220 may be shared among several first satellites 210 (e.g., simultaneously or sequentially). A fleet of second satellites 220 can thus serve a fleet of first satellites 210 to offer "gateway in space" capabilities.

In other words, the satellite communication system may further comprise one or more additional first satellites that communicate with the one or more user terminals or one or more additional user terminals. The additional first satellites further communicate with at least one (e.g., each) of the plurality of second satellites via respective additional inter-satellite communication links. This allows to extend the area of coverage of the satellite communication system by providing additional first satellites. Moreover, spare feeder link capacities of the plurality of second satellites can be offered to the additional first satellites.

The present disclosure can be further extended to first satellites that are not in the GEO. For example, the present disclosure can be applied to one or more first satellites placed in LEO/Medium Earth Orbit (MEO) or High Earth Orbit (HEO), as well as to data relay for interplanetary and scientific probes communications.

In summary, satellite communication systems according to embodiments of the disclosure employ a feeder approach that separates the repeater functionality of a satellite repeater into a user satellite (first satellite, or primary satellite) and a plurality of feeder satellites (second satellites, or auxiliary satellites) placed in orbits (e.g., geosynchronous orbits) with time-dependent projections on ground. Conventional approaches for increasing the feeder link capacity include providing a large number of feeder link stations and/or using higher frequency bands (such as the Q/V band) for communication with the feeder link stations. Going to higher frequencies necessitates provision of additional redundancy feeder link stations to maintain feeder availability and cope with high propagation losses.

The feeder approach according to embodiments of the disclosure allows to reduce the number of feeder link stations (e.g., gateway sites) compared to conventional approaches. This allows to reduce the feeder link service costs. Moreover, going to higher frequency bands is not necessary when using the proposed feeder approach and traditional satellite feeder frequencies (e.g., Ku band and/or Ka band) can be used instead, due to the intensive frequency reuse. This obviates the need for redundancy feeder link stations. In consequence, satellite communication systems according to embodiments of the disclosure can save costs and complexity compared to conventional or planned VHTS systems.

As an example, a reference VHTS scenario is described next, making reference to the satellite communication system 100 of FIG. 1. The conventional satellite repeater in the example uses the full Ka band (2.9 GHz) on the user downlink composed of 230 spot beams and uses the Q/V band on the feeder link. The required user spectrum on the downlink is 282 GHz and 69 GHz on the user uplink. The feeder link in the Q/V band requires 31 active gateways (gateway sites) with sufficient location separation (e.g., several hundreds of kilometers) considering approximately 9.5 GHz spectrum available for feeder uplink in both polarization and 4.8 GHz for feeder downlink. Taking into consideration potential additional redundant gateways that may be necessary to attain a given feeder link availability, the number of gateways in the reference VHTS scenario may be even larger.

The proposed new feeder approach allows to re-use the Ka band on the feeder link without interfering with the user link. Adding the Q/V band on the feeder link then allows to achieve a total bandwidth of approximately 14.5 GHz available for the feeder uplink. To deliver the 282 GHz required on the user link, a minimum frequency re-use factor of 20 is thus necessary (compared to 31 in the reference VHTS scenario above). This can be achieved for example with three second satellites and 7 gateway locations (feeder link stations) with 3 feeder link antennas each. Thus, the number of gateway locations can be reduced from 31 in the reference VHTS scenario to 7 in the corresponding scenario according to embodiments of the disclosure, and the number of gateway antennas can be reduced from 31 in the reference VHTS scenario to 21 in the corresponding scenario according to embodiments of the disclosure.

In the satellite communication systems according to embodiments of the disclosure, information may be relayed from the user terminals to the feeder link stations in a transparent manner, i.e., without decoding/demodulating/re-encoding/modulating received information. However, the present disclosure shall not be limited to transparent relaying, and may also relate to relaying the information in a regenerative manner, i.e., with decoding/demodulating/re-encoding/modulating received information.

Further, while reference is frequently made to feeder link antennas, the present disclosure shall likewise relate to appropriate optical receiver units for optical feeder communication.

In addition to the above, the first satellite 210 may communicate directly with the feeder link station(s) as represented by the dotted arrow in FIG. 7, in order to optimize the available spectrum usage and re-use factor. The same may hold for the first satellite 210 in the satellite communication system 200 of FIG. 2, in which such arrow is omitted for reasons of conciseness.

Figure 8:
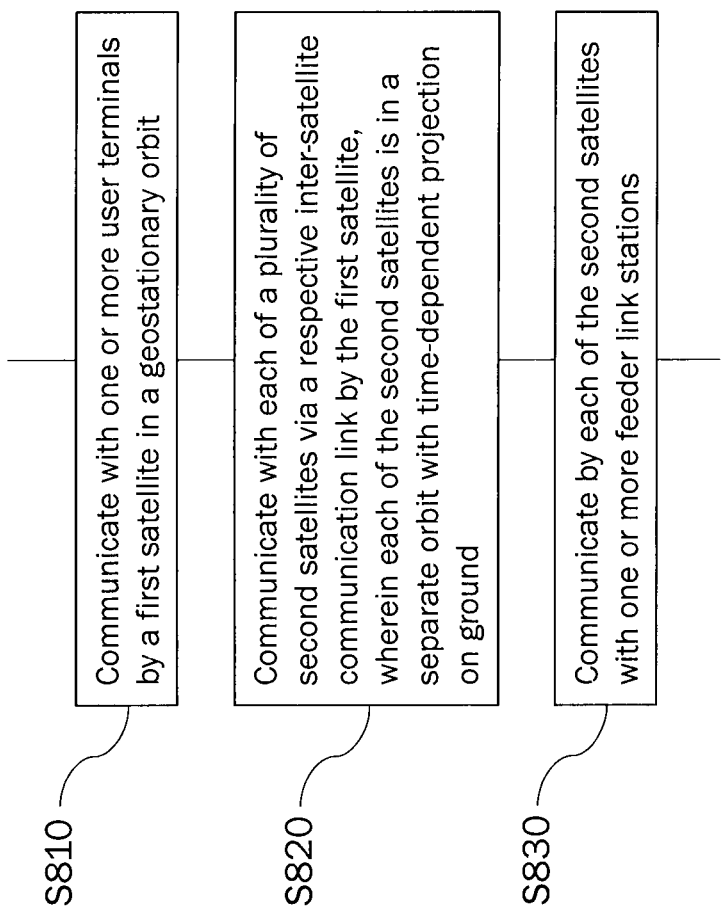
FIG. 8 is a flowchart schematically illustrating a method of communicating in a satellite communication system according to embodiments of the disclosure.

FIG. 8 is a flowchart schematically illustrating an example of a method 800 of communicating in a satellite communication system, for example the satellite communication system 200 of FIG. 2 or the satellite communication system 200' of FIG. 7.

At step S810, a first satellite in a geostationary orbit communicates with one or more user terminals. At step S820, the first satellite communicates with each of a plurality of second satellites via a respective inter-satellite communication link. Each of the second satellites is placed in a separate (e.g., geosynchronous orbit) with time-dependent projection on ground. At step S830, each of the second satellites communicates with one or more feeder link stations.

Notably, the steps of method 800 relate to a process of relaying information between the user terminals and the feeder link stations. As such, these steps may be repeatedly performed in any order. Any statements made above on satellite communication systems, for example with reference to FIG. 2 to FIG. 7, may likewise apply to the method 800.

It should be noted that the method features described above correspond to respective apparatus, system and computer program features that may not be explicitly described, for reasons of conciseness, and vice versa. The disclosure of the present document is considered to extend also to such apparatus, system, and computer program features, and vice versa. For example, such apparatus or system may be adapted (e.g., via an appropriately configured processor) to perform any or each of the steps described above, and such computer program (e.g., comprising executable instructions stored on non-transitory computer-readable media) may be adapted to cause a processor to perform any or each of the steps described above. The present disclosure should further be construed to be related to a computer-readable medium storing such computer program.

It should further be noted that the description and drawings merely illustrate the principles of the proposed method and system. Those skilled in the art will be able to implement various arrangements that, although not explicitly described or shown herein, embody the principles of the disclosure and are included within its spirit and scope. Furthermore, all examples and embodiment outlined in the present document are principally intended expressly to be only for explanatory purposes to help the reader in understanding the principles of the proposed method and system. Furthermore, all statements herein providing principles, aspects, and embodiments of the disclosure, as well as specific examples thereof, are intended to encompass equivalents thereof.

The invention claimed is:

1. A satellite communication system, comprising:
a first satellite in a geostationary orbit; and
a plurality of second satellites, each of the second satellites in a separate orbit with time-dependent projection on ground,
wherein the first satellite is adapted to communicate with one or more user terminals and to communicate with each of the plurality of second satellites via a respective inter-satellite communication link; and
each of the second satellites is adapted to communicate with each of a plurality of feeder link stations,
wherein at least two of the plurality of second satellites are spatially separated from each other by such amount that allows for full or partial frequency re-use in the communication of the first satellite with these at least two second satellites.

2. The satellite communication system according to claim 1, wherein each of the second satellites is in a separate inclined and/or eccentric geosynchronous orbit.

3. The satellite communication system according to claim 1, wherein each of the second satellites travels along a respective satellite track, each satellite track being an elongated satellite track with its latitudinal excursion greater than its longitudinal excursion.

4. The satellite communication system according to claim 1, wherein the orbit of each of the plurality of second satellites is within a predetermined range of longitudes from the first satellite's orbit.

5. The satellite communication system according to claim 2, wherein the inclination of each of the second satellites' orbits is below 15 degrees; and/or
wherein the orbit of each of the plurality of second satellites is within ±2.5 degrees longitude from the first satellite's orbit.

6. The satellite communication system according to claim 1, wherein the first satellite and at least one of the plurality of second satellites are spatially separated by such amount that allows for full or partial frequency re-use in the communication of the first satellite and the at least one second satellite with a given feeder link station.

7. The satellite communication system according to claim 1, wherein at least two of the plurality of second satellites are spatially separated from each other by such amount that allows for full or partial frequency re-use in the communication of the at least two second satellites with a given feeder link station.

8. The satellite communication system according to claim 1, wherein there is at least one pair of second satellites among the plurality of second satellites for which one of the second satellites of the pair uses a first frequency band for communicating with a given feeder link station and the other one of the second satellites of the pair uses, for communicating with the given feeder link station, a second frequency band that has at least partial overlap with the first frequency band.

9. The satellite communication system according to claim 1,
wherein the first satellite uses a third frequency band for communicating with the one or more user terminals;
wherein at least one of the plurality of second satellites uses, for communicating with a given feeder link station, a fourth frequency band that has at least partial overlap with the third frequency band; and
wherein the given feeder link station is located in an area of coverage of the first satellite, the area of coverage of the first satellite including the one or more user terminals.

10. The satellite communication system according to claim 1, wherein the plurality of second satellites communicate with the plurality of feeder link stations using RF communication in the Ka band and/or optical communication.

11. The satellite communication system according to claim 1, wherein the inter-satellite communication links use optical communication and/or RF communication.

12. The satellite communication system according to claim 1, wherein each of the second satellites is adapted to communicate, in each of a plurality of feeder link beams of that second satellite, with a respective feeder link antenna; and
wherein at least two of the feeder link antennas are substantially co-located; and/or
wherein at least one feeder link antenna communicates with two different second satellites in respective feeder link beams.

13. The satellite communication system according to claim 1, further comprising the plurality of feeder link stations.

14. The satellite communication system according to claim 10, wherein the plurality of second satellites further communicate with the plurality of feeder link stations using any or all of the C band, the Ku band, the Q/V band, or the W band.

15. A method of communicating in a satellite communication system, the method comprising:
communicating with one or more user terminals by a first satellite in a geostationary orbit;
communicating with each of a plurality of second satellites via a respective inter-satellite communication link by the first satellite, wherein each of the second satellites is in a separate orbit with time-dependent projection on ground; and
communicating, by each of the second satellites with each of a plurality of feeder link stations,
wherein at least two of the plurality of second satellites are spatially separated from each other by such amount that allows for full or partial frequency re-use in the communication of the first satellite with these at least two second satellites.

16. The method according to claim 15, wherein each of the second satellites is in a separate inclined and/or eccentric geosynchronous orbit.

17. The method according to claim 15, wherein each of the second satellites travels along a respective satellite track, each satellite track being an elongated satellite track with its latitudinal excursion greater than its longitudinal excursion.

18. The method according to claim 15, wherein the orbit of each of the plurality of second satellites is within a predetermined range of longitudes from the first satellite's orbit.

19. The method according to claim 16, wherein the inclination of each of the second satellites' orbits is below 15 degrees; and/or
wherein the orbit of each of the plurality of second satellites is within ±2.5 degrees longitude from the first satellite's orbit.

20. The method according to claim 15, wherein the first satellite and at least one of the plurality of second satellites are spatially separated by such amount that allows for full or partial frequency re-use in the communication of the first satellite and the at least one second satellite with a given feeder link station.

21. The method according to claim 15, wherein at least two of the plurality of second satellites are spatially separated from each other by such amount that allows for full or partial frequency re-use in the communication of the at least two second satellites with a given feeder link station.

22. The method according to claim 15, wherein there is at least one pair of second satellites among the plurality of second satellites for which one of the second satellites of the pair uses a first frequency band for communicating with a given feeder link station and the other one of the second satellites of the pair uses, for communicating with the given feeder link station, a second frequency band that has at least partial overlap with the first frequency band.

23. The method according to claim 15,
wherein the first satellite uses a third frequency band for communicating with the one or more user terminals;
wherein at least one of the plurality of second satellites uses, for communicating with a given feeder link station, a fourth frequency band that has at least partial overlap with the third frequency band; and
wherein the given feeder link station is located in an area of coverage of the first satellite, the area of coverage of the first satellite including the one or more user terminals.

24. The method according to claim 15, wherein the plurality of second satellites communicate with the plurality of feeder link stations using RF communication in the Ka band and/or optical communication.

25. The method according to claim 15, wherein the inter-satellite communication links use optical communication and/or RF communication.

26. The method according to claim 24, wherein the plurality of second satellites further communicate with the plurality of feeder link stations using any or all of the C band, the Ku band, the Q/V band, or the W band.

27. The method according to claim 15, further comprising adding one or more additional second satellites to an operating satellite communication system comprising the first satellite and the plurality of second satellites.

28. The method according to claim 15, further comprising relocating the first satellite during the lifetime of the first satellite to communicate with user terminals in a different area of coverage without relocating the plurality of second satellites; or replacing the first satellite without replacing the plurality of second satellites.

29. The method according to claim 15, wherein each of the second satellites is adapted to communicate, in each of claims 1 to 26 a plurality of feeder link beams of that second satellite, with a respective feeder link antenna; and
   wherein at least two of the feeder link antennas are substantially co-located; and/or
   wherein at least one feeder link antenna communicates with two different second satellites in respective feeder link beams.

* * * * *